US007440465B2

(12) United States Patent
Park

(10) Patent No.: US 7,440,465 B2
(45) Date of Patent: Oct. 21, 2008

(54) HOME GATEWAY FOR EXECUTING A FUNCTION OF A SECURITY PROTOCOL AND A METHOD THEREOF

(75) Inventor: Sang-do Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1088 days.

(21) Appl. No.: 10/320,620

(22) Filed: Dec. 17, 2002

(65) Prior Publication Data
US 2003/0128695 A1 Jul. 10, 2003

(30) Foreign Application Priority Data
Jan. 4, 2002 (KP) .................................. 2002-514

(51) Int. Cl.
H04L 12/66 (2006.01)
G06F 15/173 (2006.01)
G06F 9/00 (2006.01)
(52) U.S. Cl. ...................... 370/401; 370/352; 713/150; 726/15; 709/225; 709/229; 709/237
(58) Field of Classification Search ................ 370/467, 370/401, 352; 380/282, 285; 379/100.08, 379/88.25; 709/225, 229, 237; 726/11, 12, 726/15; 713/150
See application file for complete search history.

(56) References Cited

U.S. PATENT DOCUMENTS

| | | | | |
|---|---|---|---|---|
| 5,850,444 A | * | 12/1998 | Rune | 705/79 |
| 6,055,575 A | * | 4/2000 | Paulsen et al. | 709/229 |
| 6,061,796 A | * | 5/2000 | Chen et al. | 726/15 |
| 6,073,176 A | * | 6/2000 | Baindur et al. | 709/227 |
| 6,079,020 A | * | 6/2000 | Liu | 726/15 |
| 6,134,591 A | | 10/2000 | Nickles | |
| 6,154,839 A | * | 11/2000 | Arrow et al. | 713/154 |

(Continued)

FOREIGN PATENT DOCUMENTS

EP 1 017 206 A2 7/2000

(Continued)

OTHER PUBLICATIONS

Bruce Schneier; "Applied Cryptography, Protocols, Algorithms, and Source Code in C; ISBN: 0-471-11709-9, 0-471-12845-7"; 1996, John Wiley and Sons, Inc.; New York; XP002230276.

*Primary Examiner*—Fan Tsang
*Assistant Examiner*—Lisa Hashem
(74) *Attorney, Agent, or Firm*—Sughrue Mion, PLLC

(57) ABSTRACT

A communication connecting apparatus that is able to execute a function of a security protocol for home devices that lack the ability to process a security protocol. The communication connecting apparatus, according to the present invention, comprises a protocol detector for detecting a key exchange protocol in a packet received from an external device, a list storage unit for storing a list of devices for executing a certification procedure, and an agent unit for executing a certification procedure by transmitting a certification signal to the external device when a device corresponding to the key exchange unit exists in a device list. By this method, security can be assured not only outside but also inside of the home network in transceiving data between a device connected to the home network and the remote client.

12 Claims, 4 Drawing Sheets

U.S. PATENT DOCUMENTS

| | | | | |
|---|---|---|---|---|
| 6,212,635 | B1* | 4/2001 | Reardon | 713/165 |
| 6,308,213 | B1* | 10/2001 | Valencia | 709/229 |
| 6,487,598 | B1* | 11/2002 | Valencia | 709/227 |
| 6,557,037 | B1* | 4/2003 | Provino | 709/227 |
| 6,765,881 | B1* | 7/2004 | Rajakarunanayake | 370/256 |
| 6,772,332 | B1* | 8/2004 | Boebert et al. | 713/153 |
| 6,948,076 | B2* | 9/2005 | Saito | 726/12 |
| 7,010,608 | B2* | 3/2006 | Garg et al. | 709/229 |
| 7,032,242 | B1* | 4/2006 | Grabelsky et al. | 726/11 |
| 2001/0020241 | A1* | 9/2001 | Kawamoto et al. | 707/202 |
| 2002/0007454 | A1* | 1/2002 | Tarpenning et al. | 713/156 |
| 2002/0078379 | A1* | 6/2002 | Edwards et al. | 713/201 |
| 2002/0147791 | A1* | 10/2002 | Choi | 709/217 |
| 2003/0196087 | A1* | 10/2003 | Stringer et al. | 713/171 |
| 2004/0240669 | A1* | 12/2004 | Kempf et al. | 380/277 |
| 2007/0033642 | A1* | 2/2007 | Ganesan et al. | 726/10 |

FOREIGN PATENT DOCUMENTS

| | | |
|---|---|---|
| JP | 10-504168 A | 4/1998 |
| JP | 11-203248 A | 7/1999 |
| JP | 2001-134534 A | 5/2001 |
| JP | 2001-237818 A | 8/2001 |
| WO | WO 00/49755 A2 | 8/2000 |

* cited by examiner

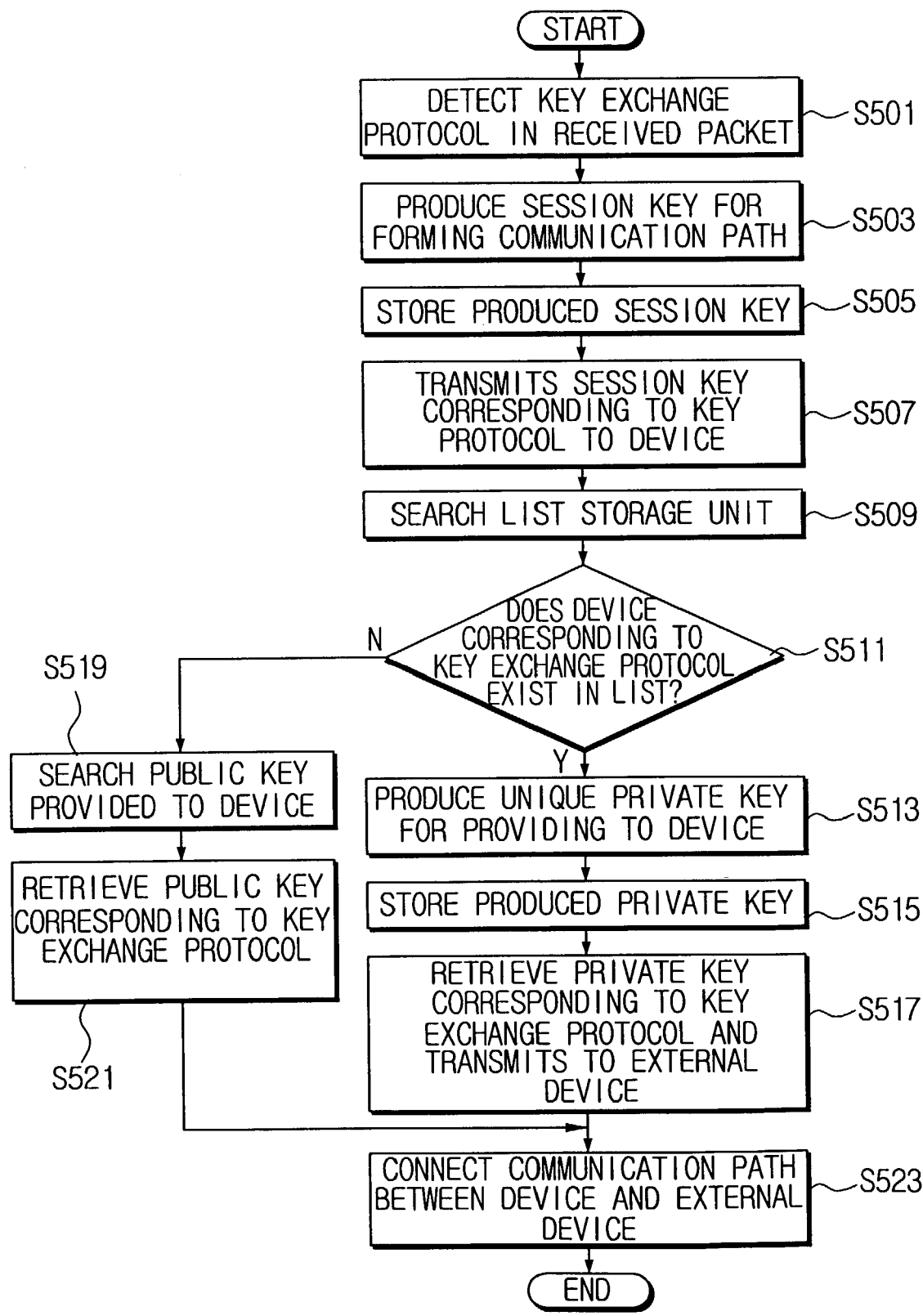

HOME GATEWAY FOR EXECUTING A FUNCTION OF A SECURITY PROTOCOL AND A METHOD THEREOF

BACKGROUND OF THE INVENTION

1. Field of the Invention

The present invention relates to a home gateway for executing a function of a security protocol and a method thereof, and more particularly, to a home gateway for executing a function of a security protocol and a method for home devices that lack the ability to execute such a security protocol. The present application is based on Korean Patent application Ser. No. 2002-514 filed on Jan. 4, 2002, which is incorporated herein by reference.

2. Description of the Related Art

Generally, a gateway system means a system that is located in between communication networks using different data communication protocols, and has a function of converting the data transmitted between the communication networks using different data communication protocols, into data suitable for each communication network. In particular, a home gateway is located in between the internet or a cable service network, i.e. an external network, and a home network and converts the data being transmitted between each different network into data suitable for each communication network. Therefore, the home gateway should allow each communication network to function independently of the other, so that the external network and the home network can adapt to each other smoothly.

A home gateway comprises an access gateway module (AGM) performing as a terminal of an external network, a premise network module (PNM) performing as a terminal of a home network, an internet digital interface (IDI) interfacing between a PNM or other internal device and an AGM, an operating system for operating an overall system, and a service module (SM) providing other services.

FIG. 1 shows a brief block diagram of a general network. Referring to FIG. 1, the local devices 10 are interconnected with each other via a home network 20. The home network 20 is connected to the internet 40 through the home gateway 30. In addition, a remote client 50 is connected to the home gateway 30 via the internet 40. The local device 10 is an information device, which is a common name for an information terminal such as a digital television, a facsimile, or a computer connected to the home network 20 and the remote client 50 can be a remote terminal such as a computer connected to the internet 40 or a mobile phone. By this structure, the remote client 50 becomes able to transceive data to/from a local device 10 connected to the home network 20 and data even to/from a remote place.

Generally, there are two ways a local device 10 connected to a home network 20 sets up a secure channel with a remote client 50 of an external network 40. The first method is to set up a secure tunnel 55 between the remote client 50 and the home gateway 30, as it is shown in FIG. 2.

Referring to FIG. 2, a dummy device 11 is connected to the home network 20 and the home network 20 is connected to the internet via the home gateway 30. Additionally, an internet service provider (ISP) 43 supplying a global internet protocol address on the internet 40 is connected to the internet 40. Also, the home gateway 30 and the remote client 50 are interconnected through the secure tunnel 55. The dummy device 11 is a device without a security protocol among devices connected to the home network 20.

The home gateway 30 is provided with a global IP address from an ISP 43 and the remote client 50 locates the home gateway 30 by a public IP address provided to the home gateway 30 from the ISP 43. The home gateway 30 and the remote client 50 communicate with each other through the secure tunnel 55 set up between the home gateway 30 and the remote client 50. In addition, the home gateway 30 provides the dummy device 11 connected to the home network 20 with a private IP, identifies each dummy device 11 by the private IP address provided, and transceives data therebetween.

The remote client 50 identifies the home gateway 30 and communicates data by a global IP address and the home gateway 30 identifies the dummy device 11 connected to the home network 20 by the private IP address, and transmits data.

However, in the above method, security between the home gateway 30 and the remote client 50 is assured by the secure tunnel 55 set up between the home gateway 30 and the remote client 50, but the security between the home gateway 30 and the dummy device 11 is not assured.

A second method for setting up a secure channel 55 between a local device 10 connected to a home network 20 and a remote client 50 of an external network, involves the local device 10 having a one to one security association with the remote client 50, as it is shown in FIG. 3.

Referring to FIG. 3, each device 13 connected to the home network 20 is provided with a global IP address from an ISP 43 connected to the internet 40. The device 13 in this method can be an information device provided with a global IP address.

The remote client 50 is connected to the home gateway 30 through the internet and each device 13 is connected to the internet 40 through the home gateway 30. The remote client 50 identifies the device 13 connected to the home network 20 by the global IP address given to each device 13, and transceives data thereto/therefrom.

However, according to the second method, although security is assured between the home network 20 and the remote client 50, and also inside the home network 20, there is a disadvantage that set up costs are too much, as each device 13 connected to the home network 20 needs to have a security protocol.

SUMMARY OF THE INVENTION

The present invention is made to solve the above-mentioned problem and accordingly it is an object of the present invention to provide a communication connecting apparatus able to assure security inside and outside the home network and reduce set up costs, and a connection method thereof.

According to the present invention, there is provided, for achieving the above object, a data transceiver comprising a protocol detector for detecting a key exchange protocol in a packet received from an external device, a list storage unit for storing a list of devices for executing a certification procedure, an agent unit for executing the certification procedure by sending a certification signal to the external device when an internal device corresponding to the key exchange protocol exists in the list, and a key storage unit for storing a session key for forming a communication path between the internal device and the external device.

The agent unit in the present invention connects the internal device and the external device by retrieving the session key corresponding to the key exchange protocol and transmitting it to the device.

Preferably, the key storage unit stores a private key that is provided to the internal device, the agent unit retrieves the private key corresponding to the key exchange protocol and sends it to the external device, and the external device identifies the internal device by the received private key.

More preferably, the key storage unit stores a public key given to the internal device, the agent unit transmits the public key to the external device when the device corresponding to the key exchange protocol does not exist in the list, and the external key identifies the device by the received public key.

Meanwhile, according to the communication connecting apparatus, a communication connecting method comprises the steps of detecting a key exchange protocol in a packet received from the external device, searching a list of devices for executing a certification procedure based on the detected key exchange protocol, and executing the certification procedure by sending a certification signal to the external device when the key exchange protocol exists in the list.

By the above structure, security inside and outside of the home network can be secured and set up costs can be reduced when each device connected to the home network is connected to an external remote client.

BRIEF DESCRIPTION OF THE DRAWINGS

The aforementioned object and characteristic of the present invention will be more apparent by describing a preferred embodiment of the present invention with reference to the accompanying drawings, in which:

FIG. 6 is a flow chart showing a communication connecting method according to the apparatus shown in FIG. 5.

DETAILED DESCRIPTION OF THE PREFERRED EMBODIMENT

Hereinafter, a preferred embodiment of the present invention will be described in greater detail with reference to the accompanying drawings.

Figure 1:
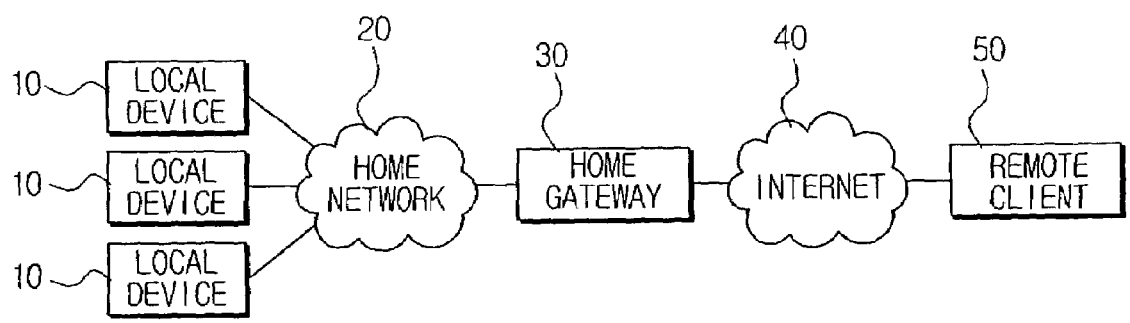
FIG. 1 is a brief block diagram of a general network.
Figure 2:
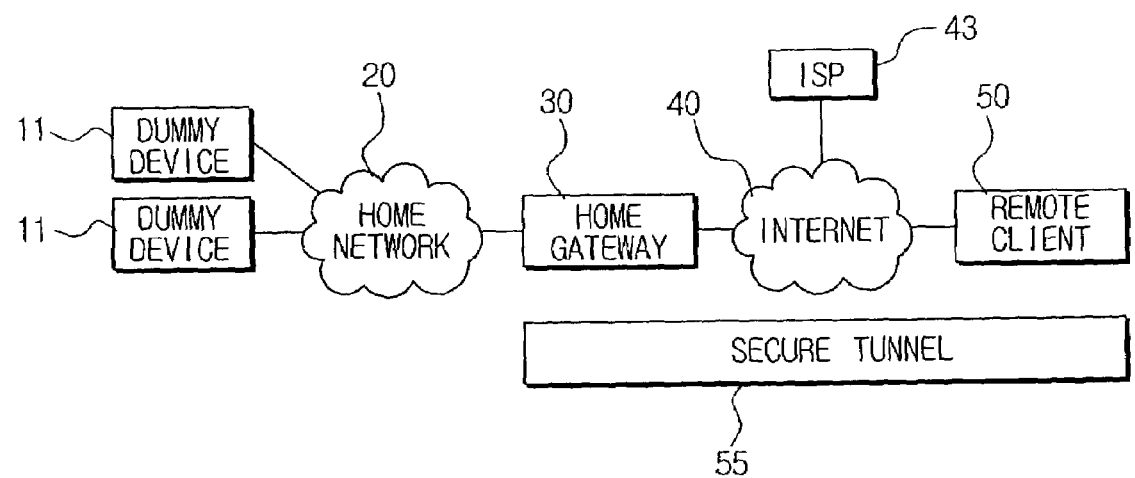
FIG. 2 is a brief block diagram of a network with a secure tunnel between a home gateway and a remote client.
Figure 3:
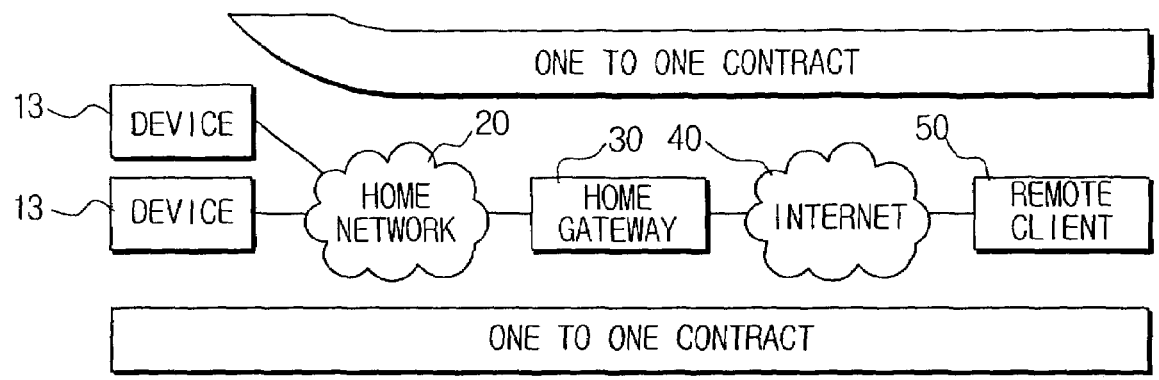
FIG. 3 is a brief block diagram of a network with security formed in between each device connected to a home network and a remote client.
Figure 4:
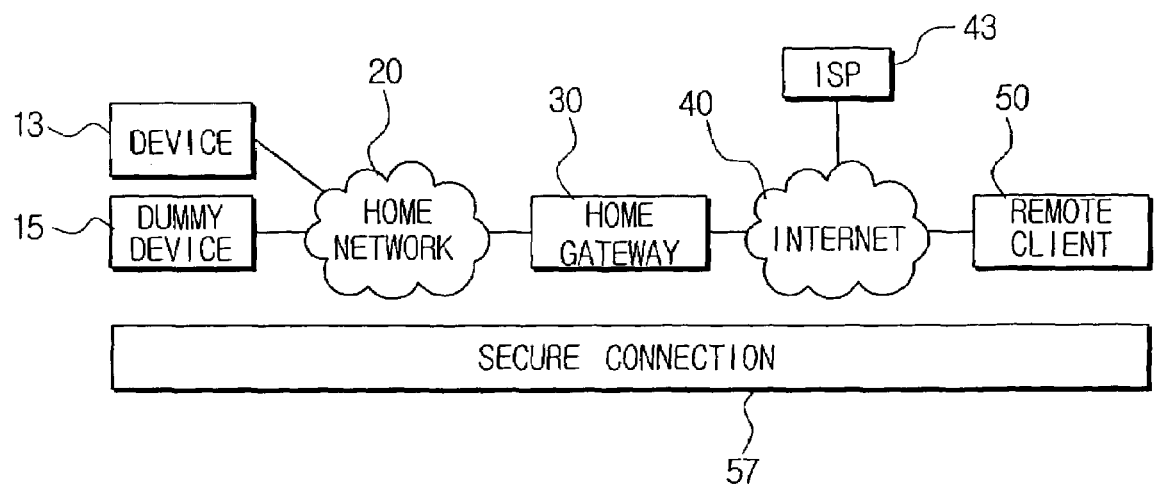
FIG. 4 is a brief block diagram of a network according to the present invention.

FIG. 4 is a brief block diagram of a network according to the present invention. Referring to FIG. 4, the device 13 and the dummy device 15 are connected to the home network 20, and the home network 20 is connected to the home gateway 30. The home gateway 30 is connected to the internet 40, and the internet 40 is connected to an ISP 43 and the remote client 50. In this drawing, the same reference numeral is given to the parts that are the same as those in FIG. 1 through FIG. 3. In addition, the device 13 can be an information device with a security protocol among information devices connected to the home network 20, whereas the dummy device 15 can be a device without a security protocol among the information devices connected to the home network 20.

The home gateway 30 is provided with a public IP address from the ISP 43 and the remote client 50 locates the home gateway 30 by the public IP address provided to the home gateway 30 by the ISP 43.

Figure 5:
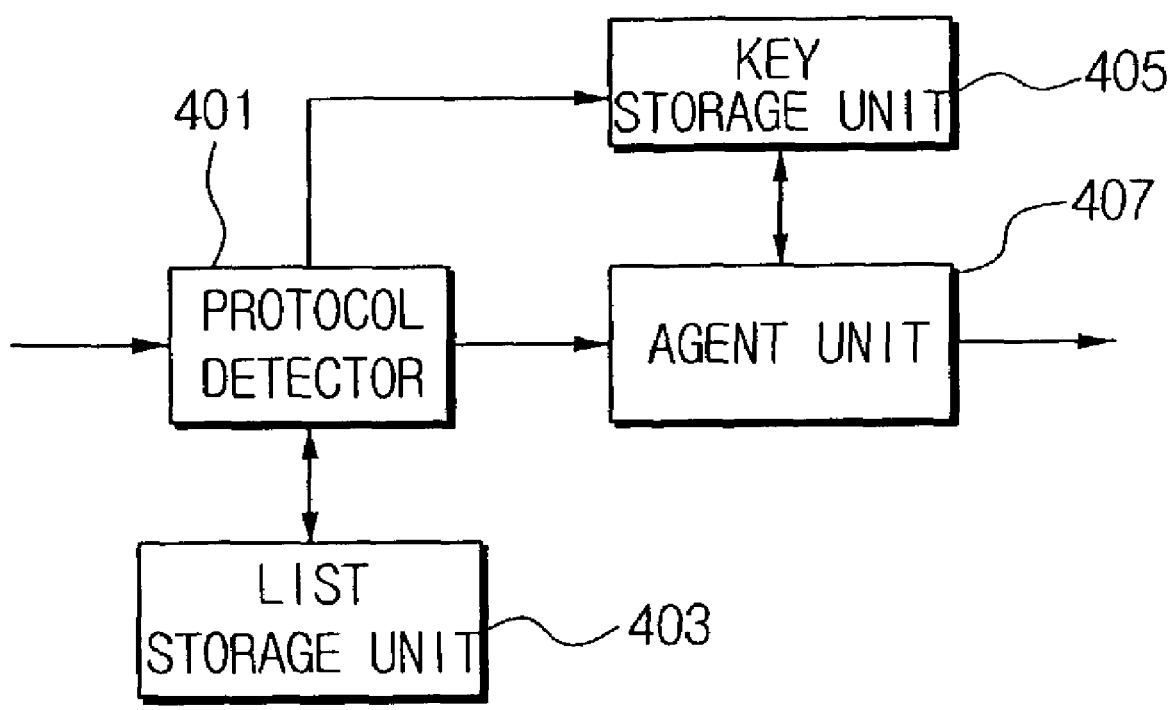
FIG. 5 is a brief block diagram of a communication connecting apparatus according to the present invention.

FIG. 5 is a brief block diagram of a communication connecting apparatus according to the present invention. Referring to FIG. 5, the communication apparatus, in other words the home gateway 30, comprises a protocol detector 401, a list storage unit 403, a key storage unit 405, and an agent unit 407.

The protocol detector 401 detects a key exchange protocol in a packet received from an external device, i.e. a remote client 50. The list storage unit 403 stores a list of devices, i.e. a dummy device 15, for executing a certification procedure. The key storage unit 405 stores a session key for forming a communication path between the dummy device 15 and the remote client 50, and a private key and a public key provided to a device 13. The agent unit 407 executes a certification procedure by sending a certification signal to the remote client when a dummy device 15 corresponding to the detected key exchange protocol exists in the list. Also, the agent unit 407 retrieves the session key corresponding to the detected key protocol, sends it to the device 13 and/or the dummy device 15, and establishes a communication path between the device 13 and/or the dummy device 15 and the remote client 50. Additionally, the agent unit 407 transmits the public key to the remote client 50 when the dummy device 15 corresponding to the key exchange protocol does not exist in the list storage unit 403, and then the remote client 50 identifies the device 13 connected to the home network by the received public key.

FIG. 6 is a flow chart showing a communication connecting method according to the apparatus in FIG. 5. Referring to FIG. 6, when a packet is received from a remote client, a protocol detector 401 of a home gateway 30 detects a key exchange protocol in the received packet (S501). In addition, the protocol detector 401 produces a session key for a device and/or a dummy device corresponding to the detected key exchange protocol, in other words, a session key for forming a communication path between an object device to which a packet is to be sent and the remote client 50 (S503). The protocol detector 401 stores the produced session key in the key storage unit 405 (S505). Additionally, the protocol detector 401 transmits a signal indicating the production and storage of the session key, to the agent unit 407. The agent unit 407 retrieves a session key corresponding to the key exchange protocol from the key storage unit 405 and transmits it to the device 13 and/or the dummy device 15 corresponding to the retrieved session key (S507). In this chart, although the agent unit 407 retrieves the session key from the key storage unit 405, it can also directly receive the session key produced by the protocol detector 401 and transmit it to the device 13 and/or the dummy device 15. By this method, a communication path between the device 13 and/or the dummy device 15 receiving a session key and the remote client 50, is established.

The protocol detector 401 searches a list storage unit 403 (S509) and determines whether a listed device corresponding to the detected key exchange protocol, i.e. the dummy device 15, exists (S511).

When a dummy device 15 corresponding to the key exchange protocol exists in the list, the protocol detector 401 produces a unique private key for providing to the dummy device 15 (S513). The protocol detector 401 stores the produced private key in the storage unit 405 (S515).

When data is received from the dummy device which has a communication path formed with the remote client 50, the protocol detector 401 transmits the received data to the agent unit 407. The agent unit 407 receives the data transmitted from the protocol detector 401 and retrieves a private key corresponding to the dummy device that was sent the data, by searching the key storage unit 405. The retrieved private key is transmitted to the remote client 50 by the agent unit 407, together with the received data (S517). The remote client 50 identifies the dummy device 15 by the received private key.

If the dummy device 15 corresponding to the key exchange protocol does not exist in the list, the protocol detector 401 transmits the signal indicating non-existence of the listed device, to the agent unit 407. The agent unit 407 searches the key storage unit 405 for a public key provided to the device 13 when receiving a signal indicating non-existence of the device from the protocol detector 401 (S519). The device 13 can be an information device with a security protocol among the information devices connected to the home network 20 and the device 13 is provided with a global IP address from the ISP 43. The global IP address provided to the device 13 is stored in the key storage unit 405.

When data is received from the device 13, the agent unit 407 retrieves a public key corresponding to the key exchange protocol from the key storage unit 405 and transmits it to the remote client 50 (S521). The remote client 50 identifies the device 13 connected to the home network 20 by the public key received from the agent unit 407.

By this method, the home gateway 30 can assure security not only outside but also inside the home network 20 in connecting a communication path between the device 13 and/or the dummy device connected to the home network 30 and the remote client 50.

According to the present invention, the communication connecting apparatus becomes able to execute a function of a security protocol for a home device that lacks the ability to process a security protocol. Additionally, it can provide security not only outside but also inside of the home network in transceiving data between a device connected to the home network and the remote client.

Although the preferred embodiments of the present invention have been described, it will be understood by those skilled in the art that the present invention should not be limited to the described preferred embodiments. Various changes and modifications can be made within the spirit and scope of the present invention as defined by the appended claims.

What is claimed is:

1. A communication connecting apparatus which is connected between a dummy device not having a security protocol function and a device having the security protocol function in a home network, the apparatus comprising:
   a protocol detector for detecting a key exchange protocol in a packet received from an external device of the home network;
   a list storage unit for storing a list of dummy devices, for executing a certification procedure; and
   an agent unit for determining that an internal device is an internal dummy device when the internal device corresponding to the key exchange protocol exists in the list, and executing the certification procedure by sending a certification signal to the external device.

2. The communication connecting apparatus of claim 1, further comprising a key storage unit for storing a session key for forming a communication path between the internal dummy device and the external device, wherein the agent unit connects the internal dummy device and the external device by retrieving the session key corresponding to the key exchange protocol and transmitting the session key to the internal dummy device.

3. The communication connecting apparatus of claim 2, wherein the key storage unit further stores a private key provided to the internal device, the agent unit retrieves the private key corresponding to the key exchange protocol and sends the private key to the external device, and the external device identifies the internal device by the received private key.

4. The communication connecting apparatus of claim 2, wherein the key storage unit further stores a public key provided to the internal device, the agent unit transmits the public key to the external device when the internal device corresponding to the key exchange protocol does not exist in the list, and the external device identifies the internal device by the received public key.

5. A communication connecting method of a communication connecting apparatus which is connected between a dummy device not having a security protocol function and a device having the security protocol function in a home network, the communication connecting apparatus comprising a protocol detector, a list storage unit, and an agent unit, the method comprising the steps of:
   detecting, by the protocol detector, a key exchange protocol in a packet received from an external device of the home network;
   searching a list of internal dummy devices for executing a certification procedure based on the key exchange protocol detected by the protocol detector, and
   determining, by the protocol detector, that an internal device is an internal dummy device when the internal dummy device corresponding to they key exchange protocol exists in a list storage unit, and executing, by the agent unit, the certification procedure by sending a certification signal to the external device.

6. The communication connecting method of claim 5, further comprising the steps of:
   generating one or more session keys for forming a communication path between the internal dummy device and the external device by the protocol detector; and
   selecting, by the agent unit, one of said one or more session keys corresponding to the key exchange protocol, and transmitting said one of said one or more session keys to the internal dummy device,
   wherein the internal dummy device is connected to the external device through a communication path according to the session key received.

7. The communication connecting method of claim 6, further comprising the steps of:
   generating, by the protocol detector, one or more unique private keys; and
   selecting, by the agent unit, one of said one or more unique private keys corresponding to the key exchange protocol and transmitting said one of said one or more unique private keys to the external device,
   wherein the external device identifies the internal device by the received said one of said one or more private keys.

8. The communication connecting method of claim 5, wherein the communication connecting apparatus further comprises a key storage unit, and said method further comprising the steps of:
   storing one or more public keys by the key storage unit; and
   determining, by the protocol detector, that an internal device is an internal dummy device when the internal dummy device corresponding to the key exchange protocol does not exist in a list, and transmitting, by the agent unit, one of said one or more public keys to the external device,
   wherein the external device identifies the internal device by said one of said one or more public keys received.

9. The communication connecting apparatus according to claim 1, wherein said internal devices are end nodes, said end nodes not being servers, home gateways, and forwarding agents.

10. The communication connecting apparatus according to claim 1, wherein said internal devices are client devices.

11. The communication connecting method according to claim 5, wherein said internal devices are end nodes, said end nodes not being servers, home gateways, and forwarding agents.

12. The communication connecting method according to claim 5, wherein said internal devices are client devices.

* * * * *